US009516685B2

(12) United States Patent
Lei et al.

(10) Patent No.: US 9,516,685 B2
(45) Date of Patent: Dec. 6, 2016

(54) DATA DISTRIBUTION METHOD, DATA DISTRIBUTION DEVICE AND HETEROGENEOUS NETWORK

(71) Applicant: CHENGDU SKSPRUCE TECHNOLOGY, CO., LTD., Chengdu, Sichuan (CN)

(72) Inventors: Yongcheng Lei, Sichuan (CN); Fang Wu, Sichuan (CN); Qian Xu, Sichuan (CN)

(73) Assignee: CHENGDU SKSPRUCE TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 14/409,459

(22) PCT Filed: May 6, 2014

(86) PCT No.: PCT/CN2014/076893
§ 371 (c)(1),
(2) Date: Dec. 18, 2014

(87) PCT Pub. No.: WO2015/010488
PCT Pub. Date: Jan. 29, 2015

(65) Prior Publication Data
US 2016/0278139 A1 Sep. 22, 2016

(30) Foreign Application Priority Data
Jul. 24, 2013 (CN) .......................... 2013 1 0313886

(51) Int. Cl.
*H04M 1/66* (2006.01)
*H04W 76/02* (2009.01)
(Continued)

(52) U.S. Cl.
CPC .......... *H04W 76/022* (2013.01); *H04W 12/06* (2013.01); *H04W 84/12* (2013.01)

(58) Field of Classification Search
CPC .. H04W 36/22; H04W 12/06; H04W 28/0263; H04W 40/04; H04W 48/18; H04W 72/0486; H04W 72/10; H04W 76/02; H04W 76/022; H04W 8/26
(Continued)

(56) References Cited

U.S. PATENT DOCUMENTS

2014/0307686 A1* 10/2014 Su .......................... H04W 76/02
370/329

FOREIGN PATENT DOCUMENTS

EP                2770794 A4 * 12/2015 ............ H04W 76/02

* cited by examiner

*Primary Examiner* — Ronald Eisner
(74) *Attorney, Agent, or Firm* — Blakely Sokoloff Taylor & Zafman LLP

(57) ABSTRACT

The present invention relates to the field of communication technology, and particularly to a data distribution method, a data distribution device and a heterogeneous network. The data distribution method comprises: obtaining, via a data distribution device, cellular network access information and wireless local area network access identification information of a user terminal; obtaining, via the data distribution device, cellular network status information and wireless local area network status information; and judging, in combination of the obtained information and distribution policy, that downlink service is required to be distributed to a wireless local area network by the data distribution device, and guiding a data package in the downlink service needed to be distributed, to be distributed to the wireless local area network and transmitted to the user terminal. The present invention achieves the data distribution controlled dynamically by operator network side, and at the same time effectively avoids the risk of uncontrollable performance of the user terminal caused by the variety of the user terminals.

8 Claims, 4 Drawing Sheets

(51) Int. Cl.
*H04W 12/06* (2009.01)
*H04W 84/12* (2009.01)

(58) Field of Classification Search
USPC ..... 455/26.1, 410–415, 565, 63.2, 443, 444; 370/338
See application file for complete search history.

DATA DISTRIBUTION METHOD, DATA DISTRIBUTION DEVICE AND HETEROGENEOUS NETWORK

TECHNICAL FIELD

The present invention relates to the field of communication technology, and particularly to a data distribution method, a data distribution device and a heterogeneous network.

BACKGROUND ART

WLAN (Wireless Local Area Network) refers to a group of computers and relative apparatuses interconnected using IEEE 802.11 wireless technology, i.e., a computer local area network with wireless channels as transmission medium. WLAN is an important complement and extension to wired network approach, gradually has become a crucial component in computer networks, and is widely applied in the field in which portable data processing is needed or physical transmission medium wiring can not be conducted. With establishment and development of the IEEE802.11 wireless network standard, wireless network technology is made more mature and complete, and has been successfully and widely applied in various industries, such as, financial securities, education, large-scale enterprises, industrial ports, government agencies, hotels, airports, armies, etc. The products mainly comprise: wireless access points, wireless network cards, wireless routers, wireless gateways, wireless bridges, etc.

WLAN mainly comprises two architectures, IBSS (Independent Basic Service Set, also called Ad-hot) and BSS (Basic Service Set, also called Infrastructure). In the IBSS architecture, as shown in FIG. 1, user terminals (user equipments, UE) communicate with each other directly through wireless connections, without specific devices required for performing relay communication. In the BSS architecture, as shown in FIG. 2, an access point (AP) is always required between the user terminals for performing the relay communication, and moreover it is possible to access Internet services through the AP.

Since the WLAN employs relatively loose technical architecture and also uses free unlicensed frequency spectrum, the WLAN is inexpensive. The WLAN has seen rapid development and deployment due to its high cost performance, and is deemed as one measure of improving local area network capacity by individual cellular network operators who take 3GPP cellular network technology as the main body of the network technology. Therefore, the 3GPP association provides in its standard a combined architecture where two kinds of WLANs access the 3GPP, that is, non-trust access and trusted access. When accessing the network in non-trust mode, since the WLAN network is not trusted by the operator, data from a WiFi network needs to firstly pass through one ePDG gateway (reinforcing message data gateway) and then through the P-GW (PDN (packet data network) gateway) in the 3GPP to access the operator's own services or Internet services. When accessing the network in trusted mode, since the WiFi network is trusted by the operator, its data can directly access the operator's own services or Internet services through the P-GW. In such architecture, the user terminal can distribute part of the data traffic to the WLAN network, so as to decrease the gradually increased traffic pressure the cellular network faces.

Before Hotspot 2.0 technology occurs, most users, when logging in the WLAN network, need to manually select the WLAN network to be accessed, from the WLAN network list searched by the terminal, and manually input user name and pin number during the sequential authentication phase to complete the access the WLAN network. Before accessing the WLAN network, the user learns the information of the WLAN network only limited to the information carried by the broadcasting information frame, the Beacon frame, or the Probe Response frame, and can not further learn back-end information of the WLAN network, for example, whether this terminal can access the WLAN network through user subscription information of a certain operator, and which IP address protocol is supported by the WLAN network, and so on. In order to achieve intelligent selection of networks, Hotspot 2.0 employs the IEEE 802.11u technology, such that the terminal uses generalized advertisement system (GAS) mechanism and the access network query protocol (ANQP) to query the back-end information of the WLAN network before accessing the WLAN network and then the user terminal automatically selects the network for WLAN, on the basis of these queried information, according to its own configured network selection policy.

When the user terminal can access not only the cellular network but also the WLAN network and other networks (e.g., WiMAX, CDMA,etc), there exist the following problems:

when around the user terminal exist plural available non-cellular systematic networks (e.g. when the user terminal discovers plural WLAN networks), there is a problem how the user terminal select an access network;

when around the user terminal exist plural available networks (e.g. when the user terminal discovers available cellular network, WiMAX network, CDMA network, WLAN network and so on existing nearby), and the user terminal only can access one kind of network at one time, there is a problem for the user terminal about how to make selection for accessing in multi-systematic networks;

when around the user terminal exist plural available networks (e.g. when the user terminal discovers available cellular network, the WiMAX network, the CDMA network, the WLAN network and so on existing nearby), and the user terminal can access and work in multiple kinds of networks at one time, there is a problem for the user terminal about how to select a service network for the data of a certain application program, that is, the user terminal needs to determine which network the data of the certain application program is transmitted through.

For solving the above problems, the 3GPP organization defines Access Network Discovery and Selection Function (ANDSF), which provides network selection information and network selection policy for the user terminal to perform network selection. ANDSF policy mainly comprises 4 parts as follows:

inter system mobility policy (ISMP), which is a policy used for assisting the user to perform the network selection when the user can communicate only in one network at one time;

inter system routing policy (ISRP), which is a policy used for selecting different service networks for ordinary data flow when the user can communicate in multiple networks at one time;

user terminal location information, which mainly stores relevant information of the user terminal location that is generally used as a determination condition for the above policy information being effective; and discovery information, which mainly provides to the user some network information of the non-cellular systematic network, making it convenient for the user to discover networks.

The ANDSF policy is stored at an ANDSF server which uses IP address of a public network. The user terminal can access it using HTTPs mode, and obtain the ANDSF policy through an Open Mobile Alliance (OMA) protocol. Sequentially, a device manager at the user terminal side will make the network selection according to the ANDSF policy.

In the combined architecture of the above cellular network and the WEAN network, the operator send the established operator network selection policy to the user terminal through the ANDSF information. The user terminal makes the network selection and data distribution, based on the local area network status detected by itself (including signal quality and traffic status of the current networks around the user) and based on the policy of the operator. Such mode has the following problems.

One key point of this solution is the implementation of the ANDSF policy made by the user terminal, however due to the diversity of manufactures of the user terminals, it is caused that individual user terminals would have difference in the implementation of the ANDSF policy, such that it would be occurred that different user terminals, based on the same ANDSF policy and under the same network environment, make different network sections or data distribution determinations, and lastly it is caused that the operator can not achieve the management and optimization on the whole network.

Since in this solution the user terminal makes the network selection and the distribution determination based on the ANDSF policy and according to local network information nearby, this solution has certain limitation, that is, the user terminal only can make one selection optimal to itself based on the local information, however this selection does not necessarily lead to the operator's whole network optimal and it is possible to cause the performance decrease of the operator's network.

Since in the solution the user obtains the ANDSF policy through accessing the ANDSF server, the obtaining procedure has a certain delay, such that the ANDSF information is a more static policy, incapable of being adapted to the network status varying dynamically.

DISCLOSURE OF THE INVENTION (I) Technical Problem to be Solved:

The technical problem to be solved by the present invention is: how to provide a data distribution method, a data distribution device and a heterogeneous network applying the data distribution device, based on control of an information collecting point on the operator network side.

(II) Technical Solution:

The technical solution provided by an embodiment of the present invention is as follows.

A data distribution method, comprising:

obtaining, via a data distribution device, cellular network access identification information and wireless local area network access identification information of a user terminal;

obtaining, via the data distribution device, cellular network status information and wireless local area network status information; and judging, in combination of the obtained information, that downlink service is required to be distributed to a wireless local area network by the data distribution device, and guiding a data package in the downlink service needed to be distributed according to distribution policy, to be distributed to the wireless local area network and transmitted to the user terminal.

Optionally, said step of obtaining the cellular network access identification information comprises:

storing, by a home subscriber server, identity information and the cellular network access identification of the user terminal after a packet data network gateway allocates cellular network access identification to the user terminal; and obtaining, by a cellular network access identification extraction device, the cellular network access identification of the user terminal from the home subscriber server and sends it to the data distribution device, which obtains the cellular network access identification information, after the user terminal detects the wireless local area network.

Optionally, the cellular network access identification extraction device is an authentication authorization and accounting server.

After the user terminal detects the wireless local area network, the wireless local area network is authorized through the authentication authorization and accounting server, and during the authentication procedure, the authentication authorization and accounting server obtains the cellular network access identification of the user terminal from the home subscriber server and sends it to the data distribution device.

Optionally, obtaining the wireless local area network access identification information comprises:

allocating the wireless local area network access identification to the user terminal through the data distribution device, and the data distribution device automatically obtaining the wireless local area network access identification information.

Optionally, it further comprises: obtaining information of an application program run by the user terminal.

Said step of judging, in combination of the obtained information, that downlink service is required to be distributed to the wireless local area network comprises: judging the user terminal being a dual-mode user terminal if obtaining the cellular network access identification information and the wireless local area network access identification information of the user terminal within preset time; and judging whether the downlink service needs to be distributed to the wireless local area network based on the obtained cellular network status information, the wireless local area network status information, and the information of the application program run by the user terminal.

Optionally, the data distribution device is connected with a wireless local area network access point through a tunnel.

Said step of guiding the data package in the downlink service needed to be distributed, to be distributed to the wireless local area network and transmitted to the user terminal comprises:

making media access layer address conversion to the data package in the downlink service needed to be distributed and transmitted to the user terminal, and sending the data package after the media access layer address conversion to the wireless local area network access point through the tunnel between the data distribution device and the wireless local area network access point and transmitted to the user terminal through the wireless local area network access point.

Optionally, the distribution policy is provided by the authentication authorization and accounting server or a policy control and charging module.

Optionally, the cellular network access identification information comprises a cellular network access IP address of the user terminal; and the wireless local area network access identification information comprises a wireless local area network access IP address of the user terminal.

The embodiment of the present invention also provides a data distribution device, comprising:

a first obtaining module, configured to obtain cellular network access identification information and wireless local area network access identification information of a user terminal;

a second obtaining module, configured to obtain cellular network status information and wireless local area network status information; and a judging and processing module, configured to judge that downlink service is required to be distributed to the wireless local area network in combination of the information obtained by the first obtaining module and the second obtaining module and distribution policy, and to guide a data package in the downlink service needed to be distributed, to be distributed to the wireless local area network and transmitted to the user terminal.

Optionally, the data distribution device is integrated in a multi-service data gateway.

The present invention also provides a heterogeneous network, comprising:

the data distribution device of any of the above kinds; and a cellular network system and a wireless local area network system respectively connected to the data distribution device.

Optionally, the cellular network system comprises:

a packet data network gateway, configured to allocate a cellular network access identification to the user terminal;

a home subscriber server, configured to store identity information and the cellular network access identification of the user terminal;

an authentication authorization and accounting server, configured to obtain the cellular network access identification information from the home subscriber server based on the identity information of the user terminal and send it the data distribution device; and a policy control and charging module, configured to provide the cellular network status information to the data distribution device, the authentication authorization and accounting server or the policy control and charging module also provides distribution policy to the data distribution device.

The wireless local area network system comprises:

a wireless local area network access point, which is connected with the data distribution device through a tunnel, wherein the wireless local area network access point provides wireless local area network status information to the data distribution device through the tunnel; data package distributed by the data distribution device through the tunnel is sent to the wireless local area network access point.

(III) Advantageous Effects:

In the data distribution method provided in the embodiment of the present invention, the cellular network access identification information and the wireless local area network access identification information of the user terminal, the cellular network status information and the wireless local area network status information are collected into the data distribution device, when the data distribution device, in combination of the obtained information and the distribution policy, judges that the downlink service needs to be distributed to the wireless local area network, it guides the data package in the downlink service needed to be distributed, to be distributed to the wireless local area network and transmitted to the user terminal, so as to achieve the data distribution controlled dynamically by the operator network side, and at the same time effectively avoid the risk of uncontrollable performance of the user terminal caused by the variety of the user terminals.

DETAILED DESCRIPTION OF EMBODIMENTS

Hereinafter, in conjunction with figures and embodiments, the embodiments of the present invention will be further described. The following embodiments are only used for describing the present invention, not intended to limit the protection scope of the present invention.

Embodiment I

Figure 1:
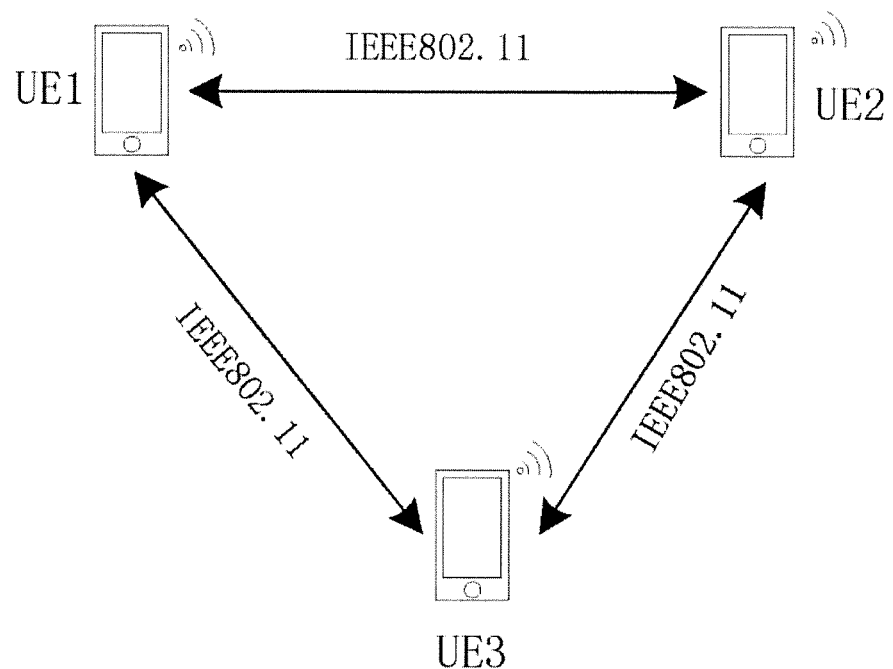
FIG. 1 is a schematic view of an independent basic service set in the prior art.
Figure 2:
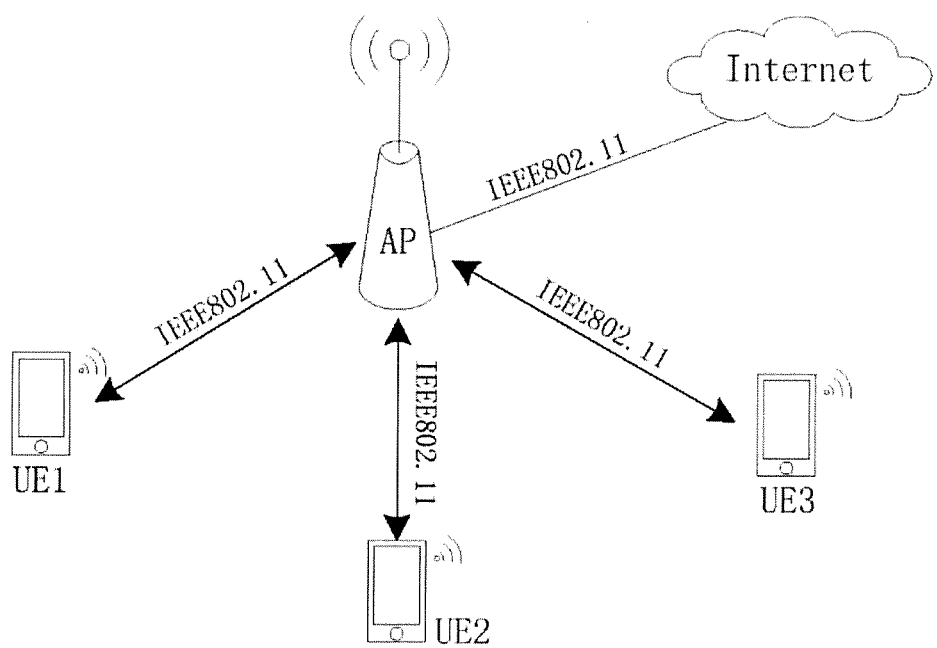
FIG. 2 is a schematic view of a basic service set in the prior art.
Figure 3:
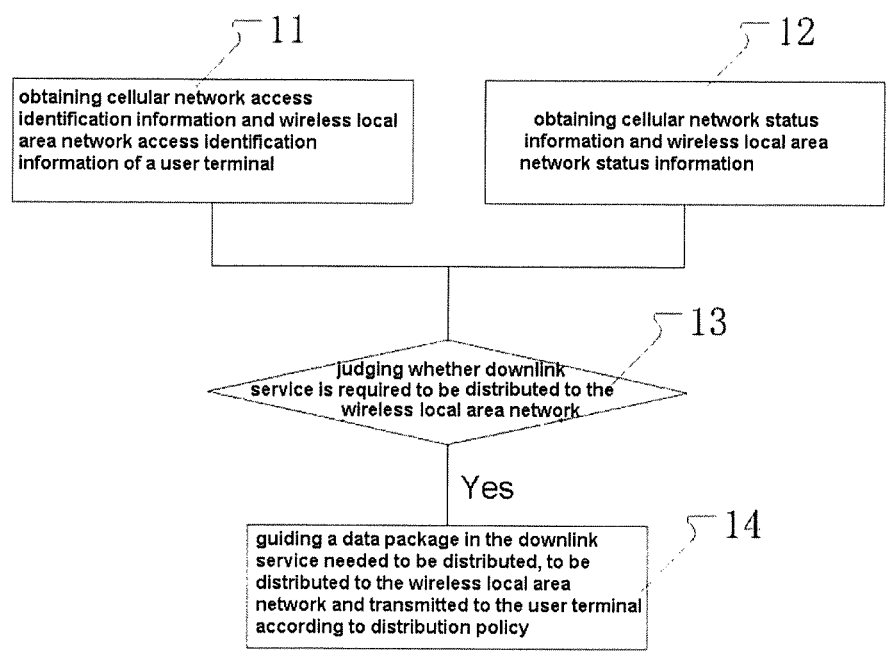
FIG. 3 is a flowchart schematic view of a data distribution method in Embodiment I of the present invention.

The preset embodiment provides a data distribution method, which mainly comprises the following steps, as shown in FIG. 3:

Step 11, obtaining, via a data distribution device, cellular network access identification information and wireless local area network access identification information of a user terminal;

Step 12, obtaining, via the data distribution device, cellular network status information and wireless local area network status information;

Step 13, judging, by the data distribution device, in combination of the obtained information (including the above identification information and the status information) and distribution policy, whether downlink service is required to be distributed to the wireless local area network; and Step 14, guiding a data package in the downlink service needed to be distributed, to be distributed to the wireless local area network and transmitted to the user terminal if in Step 13 the data distribution device judges that the downlink service is required to be distributed to the wireless local area network.

The cellular network in the embodiment of the present invention may be: a long term evolution (LIE) network, a global system for mobile communications (GSM) network, a general packet radio service (GPRS) network, a code division multiple access (CDMA) network, a wideband code division multiple access (WCDMA) network, a time division-synchronous code division multiple access (TD-SCDMA) network and the like. The wireless local area network in the present invention may be based on IEEE802.11b protocol, IEEE802.11a protocol, IEEE802.11g protocol, IEEE802.11E protocol, IEEE802.11i protocol, a wireless application protocol (WAP) and the like. In the present embodiment, the wireless local area network is a WiFi (Wireless Fidelity) network based on IEEE80211 series protocols.

In the data distribution method provided in the embodiment of the present invention, the cellular network access identification information and the wireless local area network access identification information of the user terminal, the cellular network status information and the wireless local area network status information are collected into the data distribution device, when the data distribution device, in combination of the obtained information and the distribution policy, judges that the downlink service needs to be distributed to the wireless local area network, it guides the data package in the downlink service needed to be distributed, to be distributed the wireless local area network and transmitted to the user terminal, so as to achieve the data distribution controlled dynamically by the operator network side, and at the same time effectively avoid the risk of uncontrollable performance of the user terminal caused by the variety of the user terminals.

Embodiment II

In the present embodiment, with data distribution of a particular application program in a user terminal as an example, the data distribution method of the present invention is described in detail.

Before being connected to any network, the user terminal has downloaded from an ANDSF server and stored the relevant ANDSF policy. In the ANDSF policy, according to QoS (Quality of Service) requirement of the application grogram and other relevant operator policy and the like, the application programs may be divided in 3 types:

application programs only supporting the cellular network, which refer to the application programs only supporting accessing the cellular network to work, wherein after a user starts such kind of application programs in the cellular network, it is provided with uplink and downlink data links only by the cellular network, and as for this kind of application programs, it is not necessary to implement the data distribution through the wireless local area network. For example, application programs only supporting LTE network, which only support accessing the LTE network to work, after starting the application programs only supporting the LTE network in the LTE network, it is provided with the uplink and downlink data links only by the LTE network, without the wireless local area network necessary for performing the data distribution;

application programs only supporting the wireless local area network, which refer to the application programs only supporting accessing the wireless local area network to work, wherein after a user starts such kind of application programs in the wireless local area network, it is provided with uplink and downlink data links only by the wireless local area network. For example, application programs only supporting WiFi network, which only support accessing the WiFi network to perform data transmission, after starting the application programs only supporting the WiFi network in the WiFi network, it is provided with the uplink and downlink data links only by the WiFi network; and application programs capable of performing network switching, which refer to the application programs performing the switching between the cellular network and the wireless local area network according to the current network status, and are capable to enter different network to perform data transmission. In the present embodiment, the application program capable of performing network switching, after starting, is preferable to firstly access the cellular network; for example, application programs capable of performing network switching can switch between the LTE network and the WiFi network, and after starting, is preferable to firstly access the LTE network.

In the present embodiment, since a multi-service data gateway (MSG) is normally a service collecting point in the heterogeneous network, it is able to integrate the data distribution device into a packet multi-service data gateway (MSG).

Figure 4:
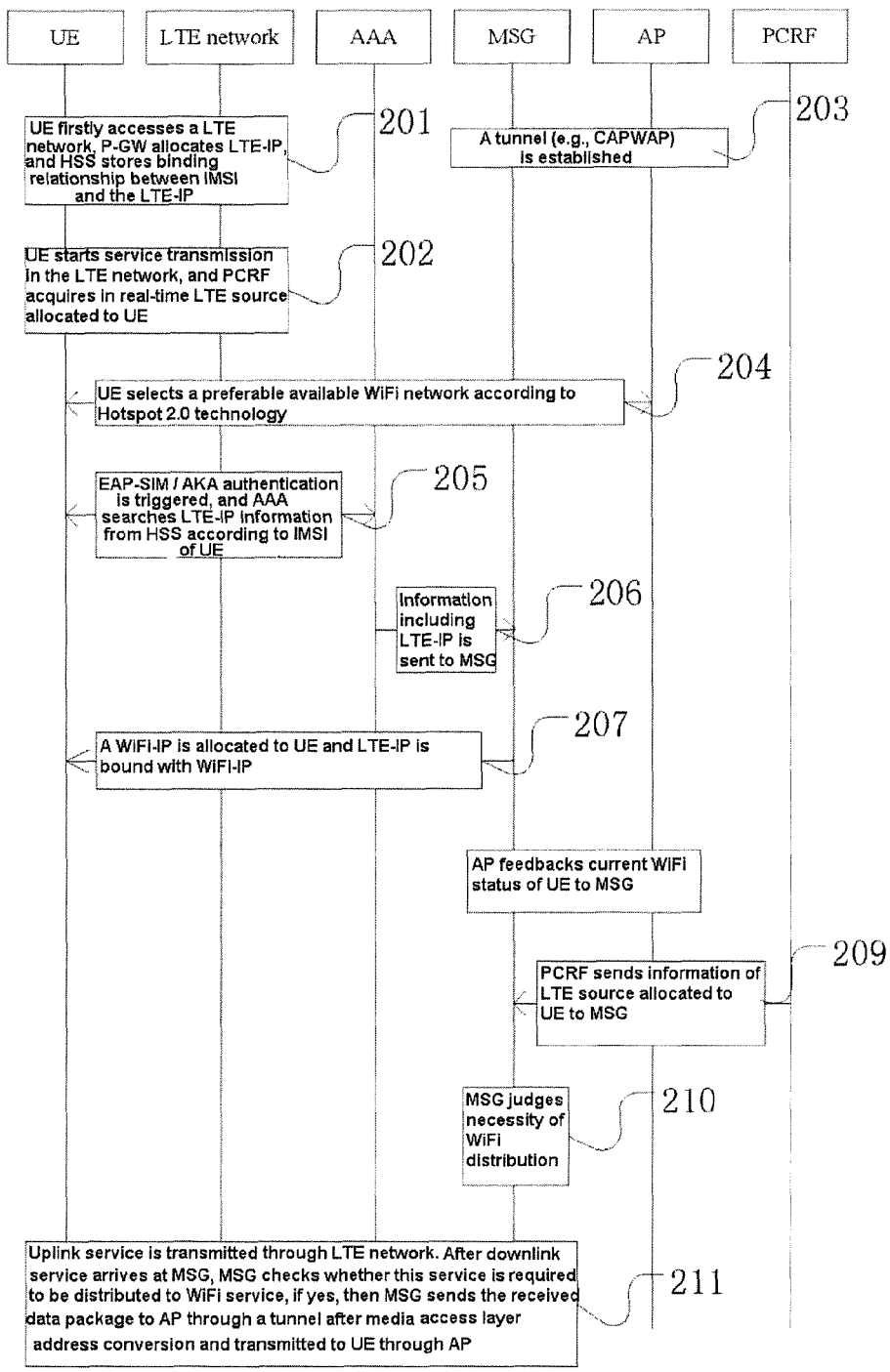
FIG. 4 is a flowchart schematic view of a data distribution method in Embodiment II of the present invention.

As shown by Step 201 in FIG. 4, whenever the user terminal has one application program capable of performing the network switching being started, the user terminal firstly accesses the cellular network, the packet data network gateway allocates cellular network access identification to the user terminal, a home subscriber server stores identity information and the cellular network access identification of the user terminal, the identity information of the user terminal may be MAC address of the user terminal, or IMSI (International Mobile Subscriber Identification) identification code, and on the like. In the present embodiment, the cellular network access identification is preferable cellular network access IP address. For example, whenever the user terminal UE has one application program (APP) capable of performing the network switching being started, the user terminal UE firstly accesses the LTE network, the packet data network gateway (P-GW) allocates LTE network access IP address to the user terminal UE, the home subscriber server (HSS) stores the IMSI identification code and the LTE network access IP address of the user terminal UE and binds the IMSI identification code of the user terminal UE with the LTE network access IP address.

As shown by Step 202 in FIG. 4, after allocating the cellular network access identification to the user terminal, the user terminal starts the uplink and downlink service transmission in the cellular network, and at the same time, the policy control and charging module in the cellular network system sends to the data distribution device the information of the network source which the cellular network system allocates to the user terminal. For example, after allocating the LTE network access IP address to the user terminal UE, the user terminal UE starts the uplink and downlink service transmission in the LTE network, and at the same time, the policy control and charging module PCRF in the LTE network system acquires in real-time the network source which the LTE network system allocates to the user terminal, and sends the information of the network source to the data distribution device.

After the user terminal enters one available wireless local area network region, the cellular network access identification extraction device obtains from the home subscriber server the cellular network access identification of the user terminal and sends it to the data distribution device, and the data distribution device obtains the cellular network access identification information. The available wireless local area network needs to work in the separated MAC module, that is, the wireless local area network access point of the wireless local area network is connected with the data distribution device through the tunnel, for example, possibly the CAPWAP tunnel or other two-layer tunnel. The user terminal in the present embodiment may directly use the Hotspot 2.0 technology to automatically complete discovery, selection and authentication of the wireless local area network. Therefore, the cellular network access identification extraction device may be the authentication authorization and accounting server. Herein, during the authentication procedure, the authentication authorization and accounting server may be used to obtain from the home subscriber server the cellular network access identification of the user terminal and send it to the data distribution device.

For example, as shown by Step 203 in FIG. 4, after the user terminal enters one available wireless local area network region, a CAPWAP tunnel is established between the wireless local area network access point of the wireless local area network and the data distribution device. As shown by Steps 204, 205 and 206 in FIG. 4, after the user terminal enters one available wireless local area network region, the user terminal uses the Hotspot 2.0 technology to automatically complete the discovery, selection and authentication of the wireless local area network, so as to enable achievement of the wireless network source of higher-quality (higher signal-to-noise ratio, better transmission rate, and the like). During the authentication procedure, EAP-SIM (authentication and secret key dispensing mechanism based on the SIM card), or EAP-AKA (authentication and secret key dispensing mechanism based on the general user identification module), or EAP-AKA' (optimized EAP-AKA) is triggered to perform identity verification. In such a way, the authentication authorization and accounting server can obtain from the home subscriber server the cellular network access identification of the user terminal and send it to the data distribution device, according to the identity identification of the user terminal. For example, after the user terminal UE enters one available WiFi network region, the user terminal uses the Hotspot 2.0 technology to automatically complete the discovery, selection and authentication of the WiFi network, so as to enable achievement of the wireless network source of higher-quality (higher signal-to-noise ratio, better transmission rate, and the like). During the authentication procedure, the authentication authorization and accounting server (AAA) obtains from the home subscriber server (HSS) the cellular network access IP address of the user terminal UE and sends it to the data distribution device, according to the IMSI identification code of the user terminal UE.

After success of the authentication, the data distribution device needs to obtain the wireless local area network access identification of the user terminal. In the present embodiment, the data distribution device may be used to allocate the wireless local area network access identification to the user terminal, and the data distribution device automatically obtains the wireless local area network access identification information.

For example, as shown by Step 207 in FIG. 4, after the success of the authentication, the data distribution device, as a DHCP (Dynamic Host Configuration Protocol) server, allocates one wireless local area network access identification to the user terminal, and at this time, the data distribution device automatically obtains the wireless local area network access identification information and binds the cellular network access identification of the user terminal with the wireless local area network access identification. For example, after the success of the authentication, the data distribution device, as a DHCP server, allocates one WiFi network access IP address to the user terminal UE, and at this time, the data distribution device automatically obtains the WiFi network access IP address and binds the LTE network access IP address of the user terminal UE with the WiFi network access IP address.

Thus, the connection of the wireless local area network of the user terminal has been successfully established, and at this time, according to the network access identification of the user terminal, the data distribution device can classify the types of the user terminals:

user terminals only having the cellular network access identification, wherein the data distribution device can judge that the current user terminal does not support accessing the wireless local area network, and it is unnecessary to perform the data distribution through the wireless local area network. For example, as for the user terminal only having the LTE network access IP address, the data distribution device can judge that the current user terminal does not support accessing the WiFi network, and it is unnecessary to perform the data distribution through the WiFi network;

user terminals only having the wireless local area network access identification, wherein the data distribution device can judge that the current user terminal does not support accessing the cellular network. For example, as for the user terminal only having the WiFi network access IP address, the data distribution device can judge that the current user terminal does not support accessing the LTE network; and user terminals simultaneously having the cellular network access identification and the wireless local area network access identification, wherein the data distribution device can judge that the current user terminal is a dual-mode user terminal and simultaneously supports accessing the cellular network and the wireless local area network. For example, as for the user terminal simultaneously having the LTE network access IP address and the WiFi network access IP address, the data distribution device can judge that the current user terminal is a dual-mode user terminal and can perform the data distribution through the WiFi network when needed.

As shown by Step 208 in FIG. 4, after the connection of the wireless local area network of the user terminal is successfully established, the wireless local area network access point can feedback the network status information of the current wireless local area network periodically or in a way of being triggered by events to the data distribution device, through a control plane of the CAPWAP tunnel established above. For example, after the connection of the WiFi network of the user terminal UE is successfully established, the AP can feedback the network status information of the current WiFi network to the data distribution device, through the control plane of the CAPWAP tunnel established above. At the same time, as shown by Step 209 in FIG. 4, the data distribution device can obtain the cellular network status information from the PCRF in the LTE network system; and since the policy control and charging module allocates the cellular network system to the network source of the user terminal according to the operator policy, thus there is a clear image illustrating how much bandwidth is allocated to the user terminal. For example, the data distribution device can obtain the LTE network status information from the PCRF in the LTE network system.

As shown by Step 210 in FIG. 4, the data distribution device, in combination of the obtained information, judges whether the downlink service needs to be distributed to the wireless local area network. For example, if the cellular network access identification information and the wireless local area network access identification information of the user terminal are obtained within a preset time (e.g. 3 or 5 seconds, or the like), then it is judged whether this user terminal is a dual-mode user terminal. After judging this user terminal is a dual-mode device, it is judged whether the downlink service needs to be distributed to the wireless local area network according to the obtained cellular network status information, the wireless local area network status information and the information of the application program run by the user terminal. For example, the data distribution device, according to the information such as the type of the application program (APP) (application program only supporting the cellular network/application program supporting the wireless local area network/application program capable of performing the network switching), the type of the user terminal (e.g., whether it is a dual-mode user terminal), the Qos type of the application program, the current network status information (e.g., available bandwidth) and the like, judges whether it is necessary to perform the data distribution through the wireless local area network.

As shown by Step 211 in FIG. 4, after the data distribution device judges it is necessary to perform the data distribution through the wireless local area network, according to the distribution policy, the data distribution device makes media access layer address conversion to the data package in the downlink service, which is needed to be distributed and transmitted to the user terminal, sends the data package after the media access layer address conversion to the wireless local area network access point through the CAPWAP tunnel between the data distribution device and the wireless local area network access point and transmits to the user terminal through the wireless local area network access point. The distribution policy can be provided by the authentication authorization and accounting serve or the policy control and charging module. For example, after the data distribution device judges that it is necessary to perform the data distribution through the WiFi network, according to the distribution policy (e.g., when the WiFi network can provide higher bandwidth to perform the distribution compared to the LTE network), as to the data package in the downlink service needed to be distributed and transmitted to the user terminal is not forwarded to the P-GW in the LTE network system anymore by the data distribution device, but is directly sent to the AP through the CAPWAP tunnel between the data distribution device and the AP after being made the media access layer address conversion, and transmitted to the user terminal through the AP.

Thus, the distribution performed through the wireless local area network has been achieved, and moreover the cellular network access identification information and the wireless local area network access identification information of the user terminal, the cellular network status information and the wireless local area network status information are collected into the data distribution device, when the data distribution device, in combination of the obtained information and the distribution policy, judges that the downlink service needs to be distributed to the wireless local area network, it guides the data package in the downlink service needed to be distributed, to be distributed to the wireless local area network and transmitted to the user terminal, so as to achieve the data distribution controlled dynamically by the operator network side, and at the same time effectively avoid the risk of uncontrollable performance of the user terminal caused by the variety of the user terminals.

Embodiment III

Figure 5:
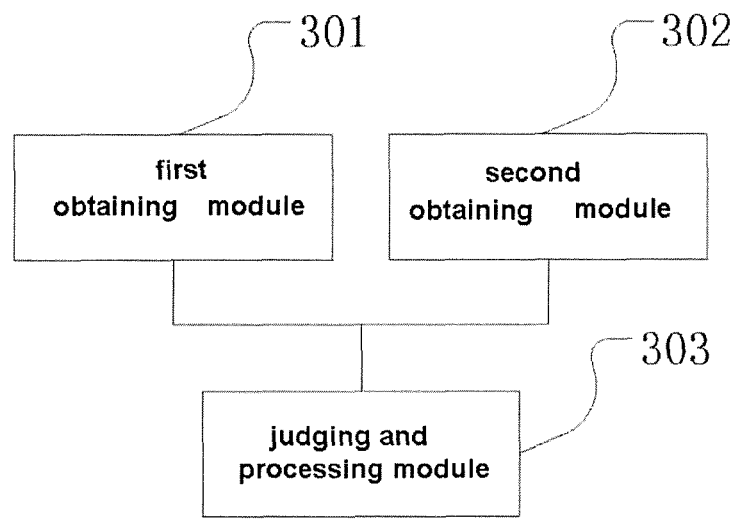
FIG. 5 is a structural schematic view of a data distribution device in Embodiment III of the present invention.

The present embodiment provides a data distribution device, as shown in FIG. 5, mainly comprising:

a first obtaining module, configured to obtain cellular network access identification information and wireless local area network access identification information of a user terminal;

a second obtaining module, configured to obtain cellular network status information and wireless local area network status information; and a judging and processing module, configured to judge that downlink service needs to be distributed to the wireless local area network in combination of the information obtained by the first obtaining module and the second obtaining module and the distribution policy, and then to guide a data package of the downlink service needed to be distributed, to be distributed to the wireless local area network and transmitted to the user terminal.

And, the above data distribution device can be integrated in a multi-service data gateway or provided separately. In the present embodiment, since a multi-service data gateway (MSG) is normally a service collecting point in a heterogeneous network, the data distribution device is integrated in a packet multi-service data gateway (MSG).

Embodiment IV

The present embodiment provides a heterogeneous network, comprising a cellular network system and a wireless local area network system, services of the cellular network and the wireless local area network sharing a same data anchor point, that is, the data distribution device provided in Embodiment III. The data distribution device can obtain information, such as the cellular network access identification information and the wireless local area network identification information of the user terminal, the cellular network status information and the wireless local area network status information as well as the distribution policy and the like, and can judge whether the downlink service needs to be distributed to the wireless local area network in combination of the obtained information, and guide the data package in the downlink service needed to be distributed, to be distributed to the wireless local area network and transmitted to the user terminal, according to the distribution policy.

Figure 6:
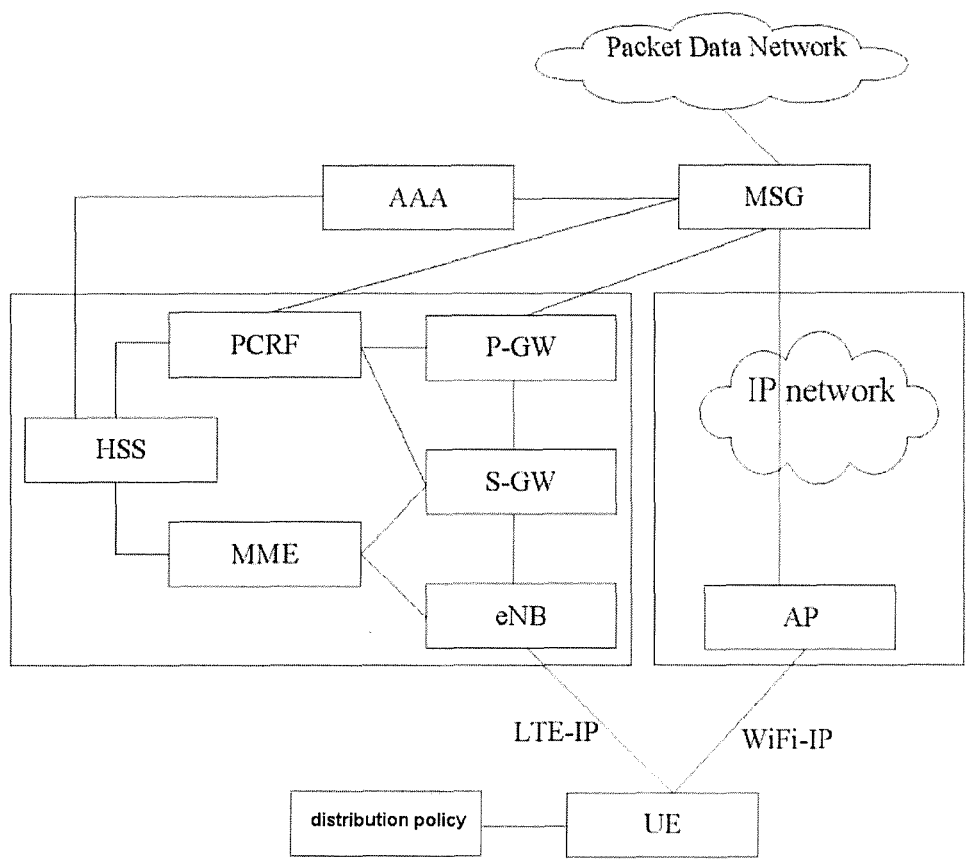
FIG. 6 is a structural schematic view of a heterogeneous network in Embodiment IV of the present invention.

As shown in FIG. 6, the cellular network system in the heterogeneous network in the present embodiment comprises:

a packet data network gateway P-GW, configured to be responsible for accessing the cellular network (e.g. the LTE network) to the packet data network and allocating the cellular network access identification (e.g., the LTE network access IP address) to the user terminal;

a home subscriber server (HSS), mainly configured to store parameters of related users and information about the position where the related users are located currently, and in the present embodiment, the home subscriber server stores the identity information of the user terminal and the cellular network access identification;

an authentication authorization and accounting server, configured to perform identity authentication, identity authorization and statistical accounting function, and in the present embodiment, the authentication authorization and accounting server can obtain the cellular network access identification information from the home subscriber server based on the identity information of the user terminal and send it the data distribution device (i.e., MSG in FIG. 6);

a policy control and charging module, configured to provide available data transmission policy (corresponding to the above distribution policy) and charging control policy, and in the present embodiment, the policy control and charging module is also configured to provide the cellular network status information to the data distribution device, the authentication authorization and accounting server or the policy control and charging module PCRF also provides the distribution policy to the data distribution device.

The wireless local area network system comprises:

a wireless local area network access point, which is connected with the data distribution device through a CAPWAP tunnel, with the wireless local area network access point providing wireless local area network status information to the data distribution device through the CAPWAP tunnel; and the data package distributed by the data distribution device through the CAPWAP tunnel being sent to the wireless local area network access point.

In the heterogeneous network provided by the present invention, the cellular network access identification information and the wireless local area network access identification information of the user terminal, the cellular network status information and the wireless local area network status information are collected into the data distribution device, when the data distribution device, in combination of the obtained information and the distribution policy, judges that the downlink service needs to be distributed to the wireless local area network, it guides the data package in the downlink service needed to be distributed, to be distributed to the wireless local area network and transmitted to the user terminal, so as to achieve the data distribution controlled dynamically by the operator network side, and at the same time effectively avoid the risk of uncontrollable performance of the user terminal caused by the variety of the user terminals.

The above embodiments are provided merely for describing the present invention, instead of limiting the invention. The ordinary person skilled in the art, without departing from the spirit and scope of the present invention, can make various changes and variations, thus all the equivalent technical solutions are covered by the protection scope of the present invention.

The invention claimed is:

1. A data distribution method, comprising:
    obtaining, via a data distribution device, cellular network access identification information and wireless local area network access identification information of a user terminal;
    obtaining, via the data distribution device, cellular network status information and wireless local area network status information; and
    judging, based on the cellular network access identification information, the wireless local area network access identification information, the cellular network status information, the wireless local area network status information, and a distribution policy, that downlink service is required to be distributed to a wireless local area network by the data distribution device, and guiding a data package needed to be distributed in the downlink service, to be distributed to the wireless local area network and transmitted to the user terminal.

2. The data distribution method according to claim 1, wherein said step of obtaining the cellular network access identification information comprises:
    storing, by a home subscriber server, identity information and cellular network access identification of the user terminal after a packet data network gateway allocates the cellular network access identification to the user terminal; and
    obtaining, by a cellular network access identification extraction device, the cellular network access identification of the user terminal from the home subscriber server and sends it to the data distribution device, which obtains the cellular network access identification information, after the user terminal detects the wireless local area network.

3. The data distribution method according to claim 1, wherein said obtaining the wireless local area network access identification information comprises:
    allocating the wireless local area network access identification to the user terminal through the data distribution device, and the data distribution device automatically obtaining the wireless local area network access identification information.

4. The data distribution method according to claim 1, it further comprises: obtaining information of an application program run by the user terminal;
    said step of judging, in combination of the obtained information, that the downlink service is required to be distributed to the wireless local area network comprises: judging the user terminal being a dual-mode user terminal if obtaining the cellular network access identification information and the wireless local area network access identification information of the user terminal within preset time; and
    judging whether the downlink service needs to be distributed to the wireless local area network based on the obtained cellular network status information, the wireless local area network status information and the information of the application program run by the user terminal.

5. The data distribution method according to any of claims 1-4, wherein the data distribution device is connected with a wireless local area network access point through a tunnel;
    said step of guiding the data package in the downlink service needed to be distributed, to be distributed to the wireless local area network and transmitted to the user terminal comprises:
    making media access layer address conversion to the data package in the downlink service needed to be distributed and transmitted to the user terminal, and sending the data package after the media access layer address conversion to the wireless local area network access point through the tunnel between the data distribution device and the wireless local area network access point and transmitted to the user terminal through the wireless local area network access point.

6. The data distribution method according to any of claims 1-4, wherein the cellular network access identification information comprises a cellular network access IP address of the user terminal; and the wireless local area network access identification information comprises a wireless local area network access IP address of the user terminal.

7. A data distribution device, comprising:
    a first obtaining module, configured to obtain cellular network access identification information and wireless local area network access identification information of a user terminal;
    a second obtaining module, configured to obtain cellular network status information and wireless local area network status information; and
    a judging and processing module, configured to judge, based on the cellular network access identification information, the wireless local area network access identification information, the cellular network status information, the wireless local area network status information, and a distribution policy, that downlink service needs to be distributed to a wireless local area network, and configured to guide a data package needed to be distributed in the downlink service, to be distributed to the wireless local area network and transmitted to the user terminal.

8. The data distribution device according to claim 7, wherein the data distribution device is integrated in a multi-service data gateway.

* * * * *